United States Patent [19]
Speer

[11] 3,725,963
[45] Apr. 10, 1973

[54] LIQUID WASTE TREATING MEANS FOR INCINERATOR TOILETS

[75] Inventor: Philip C. Speer, Staten Island, N.Y.

[73] Assignee: Tekmar Corporation, Stamford, Conn.

[22] Filed: Oct. 26, 1971

[21] Appl. No.: 191,974

[52] U.S. Cl. .................................. 4/131, 110/9 R
[51] Int. Cl. .............................. A47k 11/02
[58] Field of Search ..................... 4/131, 118, 10; 110/9 E, 9 R

[56] References Cited
UNITED STATES PATENTS

| | | | |
|---|---|---|---|
| 1,290,615 | 1/1919 | McGary | 4/8 |
| 2,678,450 | 5/1954 | Simpson et al. | 4/131 X |
| 3,474,468 | 10/1969 | Blankenship | 4/131 |
| 3,548,421 | 12/1970 | Valdespino | 4/131 |

Primary Examiner—Henry K. Artis
Attorney—A. Yates Dowell, Jr.

[57] ABSTRACT

Apparatus for disposing of liquid waste matter in an incinerator toilet by evaporation of such liquid, as well as providing means for accelerating the cooling of the toilet so that the toilet can be used in a relatively short time.

6 Claims, 5 Drawing Figures

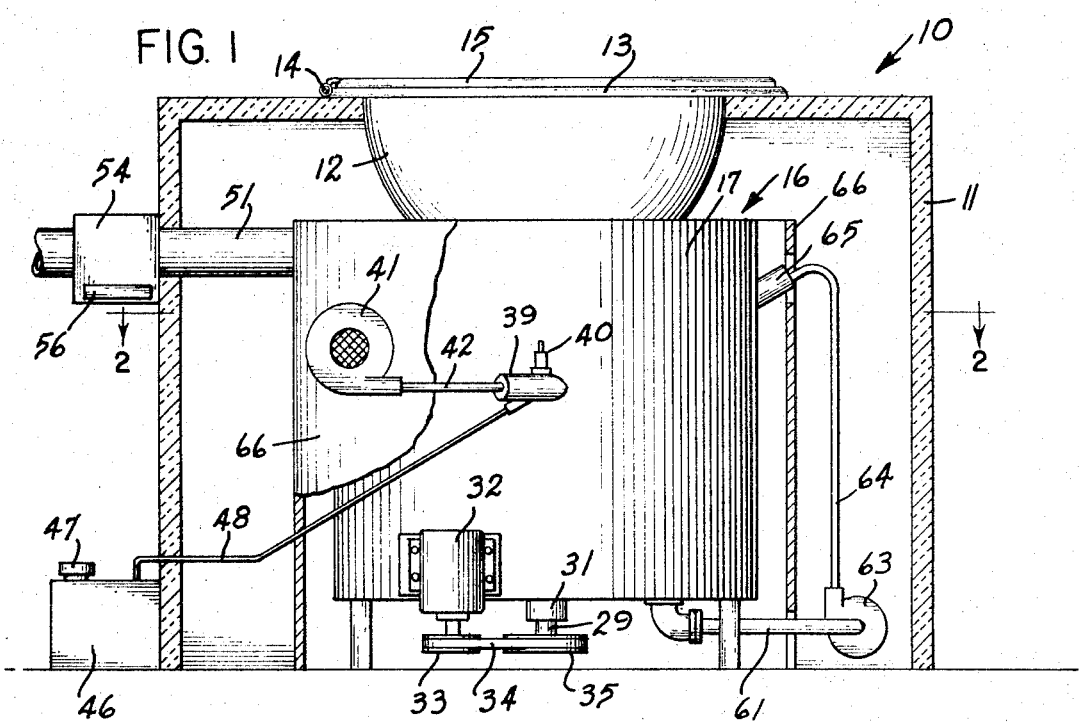
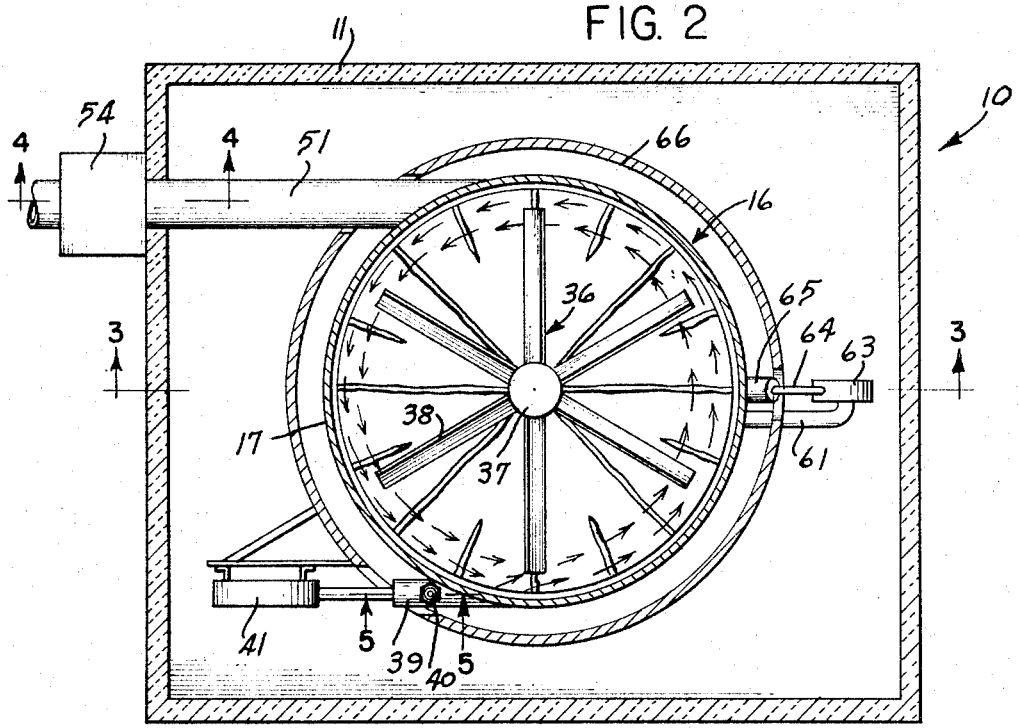

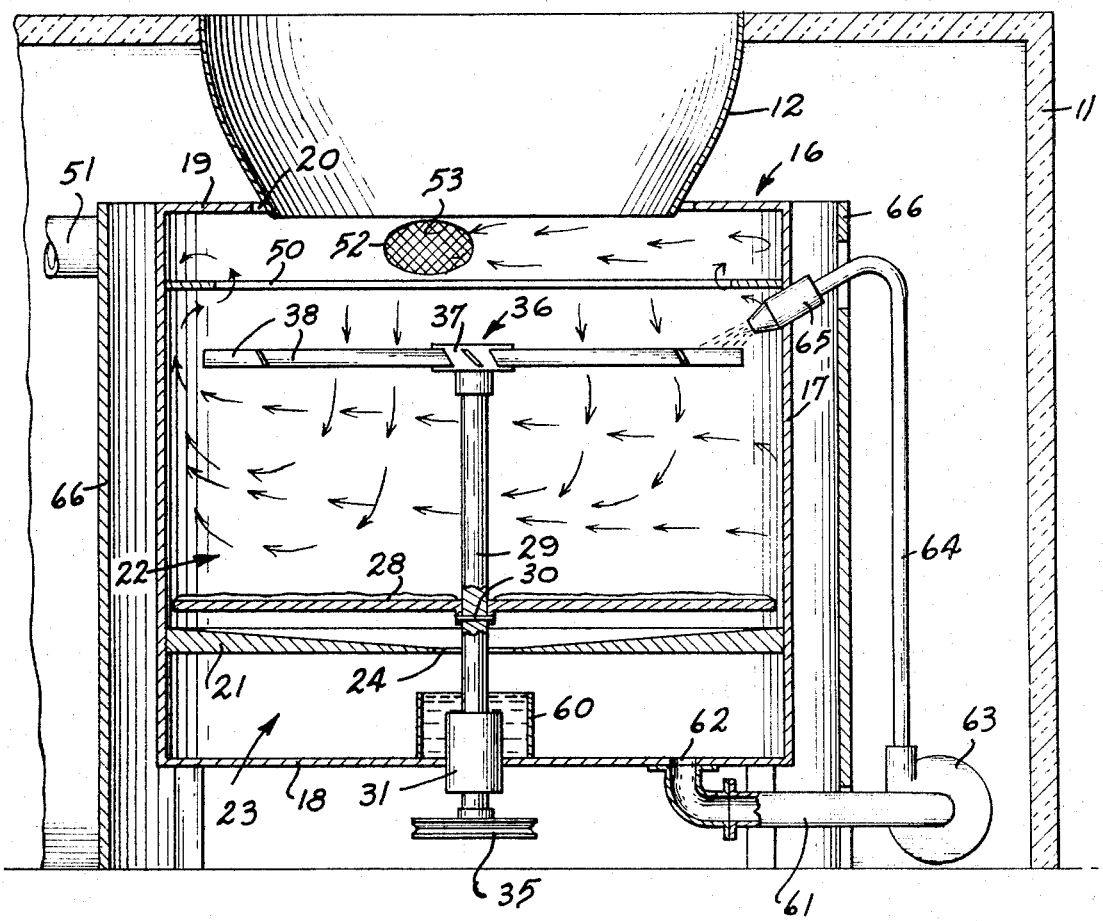
FIG. 3
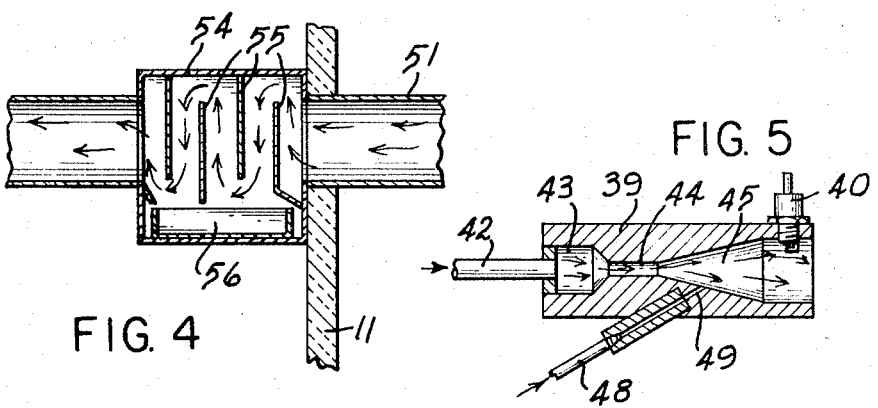
FIG. 4
FIG. 5

LIQUID WASTE TREATING MEANS FOR INCINERATOR TOILETS

BACKGROUND OF THE INVENTION

1. Field of the Invention

This invention relates generally to sanitation apparatus and relates particularly to apparatus for disposing of waste matter by incineration, preferably by an open flame, and in which both solid and liquid waste matter are eliminated.

2. Description of the Prior Art

Many efforts have been made to dispose of waste matter of humans, including by aerobic or anaerobic treatment, chemical treatment and decomposition, as well as incineration by heat from an open flame or an electric heating element. Aerobic and anaerobic treatment of the waste matter normally has not been feasible on a small scale and, therefore, has been limited for use by municipalities. Decomposition of waste by chemical treatment has been slow and has required that the chemicals be discharged from the toilet and replaced periodically. Incineration of small quantities of waste matter has proved partially successful, however most of the incinerator toilets now available are adapted to incinerate only the solid waste matter while the liquid waste matter is chemically treated to neutralize the same after which the liquid waste matter is discharged from the toilet. Some examples of incinerating apparatus are the U.S. Pat. Nos. to Valdespino 3,548,421, Simpson 2,678,450, Potts 2,732,564, and McGary 1,290,615. In many localities the treating and discharging of waste matter in either solid or liquid form is prohibited by law and, therefore, most of these prior art devices have not met the sanitation standards of all communities. Some efforts have been made to evaporate liquid waste matter, such as the Simpson patent and the Potts patent, however, these efforts have not been entirely satisfactory.

SUMMARY OF THE INVENTION

The present invention is an apparatus for comminuting and incinerating solid waste matter by means of an open flame introduced around the periphery of a combustion chamber and traveling in a swirling, burning path to completely incinerate the solid waste matter in a minimum of time. The liquid waste matter is stored during the incineration of the solid waste after which such liquid waste is forcibly projected into the combustion chamber so that the liquid waste is vaporized and carried out through the discharge pipe communicating with the combustion chamber. Simultaneously, the liquid waste accelerates the cooling of the combustion chamber, as well as the elements therein so that the toilet can be reused in a shorter length of time.

It is an object of the invention to provide a liquid waste treating apparatus for an incinerator toilet in which the liquid waste matter is first used for preventing the overheating of one or more shaft bearings and then is atomized and projected into the combustion chamber so that the liquid waste matter will be vaporized and carried out of the chamber while simultaneously providing a cooling effect within the combustion chamber.

BRIEF DESCRIPTION OF THE DRAWINGS

FIG. 1 is a side elevation with portions broken away for clarity.

FIG. 2 is a section on the line 2—2 of FIG. 1.

FIG. 3 is an enlarged section on the line 3—3 of FIG. 2.

FIG. 4 is an enlarged section on the line 4—4 of FIG. 2.

FIG. 5 is an enlarged section on the line 5—5 of FIG. 2.

DESCRIPTION OF THE PREFERRED EMBODIMENT

With continued reference to the drawings, an incinerator toilet 10 is provided having a housing 11 normally constructed of heat insulating material. An upper generally frustoconical compartment 12 is mounted in the housing 11 and extends therethrough to provide communication with the exterior. A conventional toilet seat 13 is located above the upper compartment 12 and such seat is swingably mounted on the housing 11 by a hinge 14. A lid or cover 15 also is mounted on the hinge 14 and is adapted to close one end of the upper compartment when the toilet is not in use.

A lower compartment 16 is located directly below the upper compartment 12 and includes a generally cylindrical side wall 17 having a bottom wall 18 at one end and a top wall 19 at the other end. The top wall 19 has an opening 20 disposed substantially centrally thereof and through which the lower end of the upper compartment 12 extends generally concentrically and in spaced relationship. If desired, the upper compartment 12 could be spaced from the lower compartment 16 as long as they are disposed generally axially of each other so that material discharged into the upper compartment will fall by gravity into the lower compartment. Preferably, the upper compartment does not physically engage the lower compartment so that any transfer of heat will be by radiation only.

Within the lower compartment 16, a partition 21 is provided which substantially divides the lower compartment into an upper combustion chamber 22 and a lower liquid storage chamber 23. The partition 21 has a relatively small central opening 24 extending therethrough and the upper surface of such partition tapers radially downwardly from the periphery to the central opening to facilitate the draining of liquids from the combustion chamber 22.

A comminuting plate 28, having a roughened upper surface, is located in the combustion chamber 22 adjacent to the partition 21 and such comminuting plate has an outer diameter slightly less than the internal diameter of the combustion chamber. The plate 28 is fixed to a shaft 29 in any desired manner as by a pin 30. A bearing or bushing 31, which is welded or otherwise fixed to the bottom wall 18, rotatably supports the shaft 29 in a substantially vertical position and such shaft is adapted to be driven in any desired manner as by a motor 32 having a drive pulley 33 connected by a drive belt 34 to a driven pulley 35 fixed to one end of the shaft 29. Such shaft extends upwardly through the partition opening 24 to the upper portion of the combustion chamber 22. A fan 36 having a hub 37 and a plurality of blades 38 is mounted on the upper extremity of the shaft 29 so that when the shaft is rotated, air will be drawn downwardly into the combustion chamber.

Waste matter which is received in the lower compartment falls by gravity onto the comminuting plate 28 where the solid waste matter remains temporarily and the liquid waste matter flows off of such plate onto the upper surface of the partition 21 and through the central opening 24 into the liquid storage chamber 23. When the comminuting plate 28 is rotated, the solid waste matter is comminuted to particulate size by the rough upper surface of the plate 28 and is projected outwardly by centrifugal action against the inner peripheral wall of the combustion chamber 22 to which particle size material will cling. Relatively large pieces of matter which are thrown against the inner wall will bounce back onto the plate 28 to be further comminuted.

As illustrated best in FIGS. 1 and 5, in order to incinerate the particulate matter clinging to the wall of the combustion chamber, a combustible mixture of fuel and air is introduced through a nozzle 39 and such mixture is ignited in any desired manner as by a spark plug 40. The nozzle 39 is arranged generally tangentially of the inner periphery of the combustion chamber so that the open flame will be projected around the periphery of the chamber in a swirling, burning path.

A convenient way of providing the combustible mixture includes a blower or fan 41 connected by a pipe 42 to the nozzle 39. As illustrated, the nozzle 39 has a venturi section with a high pressure side 43, a reduced throat 44 and a tapered low pressure side 45. Air under pressure from the high pressure side passes through the reduced throat where the velocity is increased and the pressure is reduced in direct portion to each other to create a negative pressure or partial vacuum at the downstream low pressure side 45. A fuel tank 46 having a filling neck and cap 47 is disposed exteriorly of the housing 11 and such tank is connected by a fuel line 48 to the nozzle 39 substantially in alignment with a relatively small orifice 49. The orifice is in communication with the low pressure side 45 of the nozzle so that the negative pressure within the low pressure side draws fuel from the tank 46 through the fuel line 48 and entrains such fuel in the air passing through the nozzle 39. The mixture of fuel and air is ignited and exhausted from the nozzle at high velocity and substantially at atmospheric pressure. Although a venturi type nozzle has been illustrated and described, it is contemplated that any conventional carburetor which mixes fuel with air to form a combustible mixture could be used.

The operation of the fan 36 draws air into the combustion chamber to further support combustion in the chamber. Such fan draws a column of air downwardly along the central axis of the combustion chamber. When the air from the fan impinges on the comminuting plate 28, such air spirals upwardly around the inner periphery of the combustion chamber under the influence of the flame and provides additional oxygen to further support combustion. Adjacent to the top wall 19 an inwardly extending baffle ring 50 is provided which directs the upward flow of air toward the center of the combustion chamber and then upwardly around the baffle ring into the upper portion of the chamber. Relatively large particles of material which are still burning and are entrained in the air flow will be thrown out of the upward flow of air and will be caught by the downward flow in the center of the combustion chamber and be carried back to the comminuting plate. A discharge pipe or flue 51 is connected generally tangentially to the upper portion of the combustion chamber and such upper portion has an opening 52 providing communication between the combustion chamber and the discharge pipe. If desired, a screen 53 may be disposed over the opening 52 to prevent most burning particles and ash from entering the discharge pipe.

In order to remove all impurities and ash from the flow of air being discharged, a baffle box 54 is mounted on the exterior of the housing 11 and in communication with the discharge pipe or flue 51. The box 54 has a plurality of vertically disposed staggered baffles 55 which direct the air in a serpentine path through the box 54. In the lower portion of the box a removable drawer 56 is provided so that fly ash and other impurities, which fall out of suspension with the air, fall by gravity into the drawer 56. Such drawer is removable from the box 54 to permit the ashes to be discharged periodically. From the baffle box 54 the relatively clean air is discharged to atmosphere.

Within the liquid storage chamber 23 a well or generally cylindrical wall 60 is disposed about the shaft 29 and the bearing 31 and such well is welded or otherwise attached to the bottom wall 18 of the housing. Liquid which drains down the upper surface of the partition 21 and through the opening 24 falls by gravity into the well 60 so that such liquid will prevent the bearing 31 from overheating when the shaft is rotated and the temperature within the combustion chamber rises to an elevated temperature. Excess liquid will overflow the top of the well 60 and will be retained within the liquid storage chamber 23.

During the incinerating cycle, the interior of the combustion chamber as well as the shaft 29, the comminutor plate 28 and the fan 36 reach a temperature of approximately 2000°. After the solid waste matter has been incinerated by the flame, the introduction of combustible mixture and ignition thereof is interrupted by a timing mechanism, not shown, and the motor 32 continues to operate to draw air down into the combustion chamber for cooling the elements within the chamber. In order to accelerate the cooling operation as well as to dispose of the liquid waste matter, a fluid pipe 61 is connected to the bottom wall 18 of the lower compartment and communicates with the liquid storage chamber through an opening 62. The pipe 61 is connected to a pump 63 having a discharge pipe 64 extending upwardly adjacent to the lower compartment 16. The upper end of the discharge pipe 64 is bent inwardly and downwardly and terminates in an atomizing nozzle 65. The discharge end of such atomizing nozzle extends through the side wall 17 of the lower compartment and is disposed generally radially in a position to direct atomized liquid into the combustion chamber.

When the pump 63 is operated, liquid waste matter is forced through the nozzle 65 and sprayed in a relatively fine mist into the combustion chamber. The mist which impinges upon the fan blades 38, the comminuting plate 28 and the inner periphery of the combustion chamber 22 is vaporized instantly by the hot surfaces and the vapor is carried upwardly with the flow of air around the combustion chamber and discharged through the discharge pipe or flue 51. Contact of the atomized liquid against the hot surfaces within the combustion chamber not only vaporizes the liquid but also accelerates the cooling of the hot surfaces so that the toilet can be reused in a relatively short period of time.

If desired, a reflective shield 66 can be disposed about the lower compartment 16 and closely adjacent thereto to reflect heat radiating from the lower compartment and thereby confine the heat substantially to the combustion chamber.

Although the combustion chamber has been illustrated and described as using a combustible fuel which is ignited to provide an open flame, it is contemplated that the solid waste matter could be incinerated by any other suitable source of heat including by electrical resistance heating elements.

In the operation of the device, waste matter in solid or liquid form is introduced into the combustion chamber 22 where the solid waste matter will fall by gravity onto the comminutor plate 28 and the liquid waste matter will flow down the upper surface of the partition 21 and through the opening 24 into the liquid storage chamber 23. When all of the waste matter has been introduced into the lower compartment the lid 15 is closed and the incinerator apparatus is started. In this position the motor 32 is operated to drive the comminuting plate 28 and fan 36 so that the rough upper surface of the comminutor plate comminutes the solid waste matter into particle size and throws such particulate matter against the inner periphery of the combustion chamber 22 by centrifugal action. Larger pieces of material which are thrown from the plate 28 bounce from the wall back onto the plate where such larger pieces are further comminuted. Simultaneously a combustible mixture of fuel and air is ignited and projected into the combustion chamber at high velocity and generally tangentially so that a swirling flame will extend substantially entirely around the combustion chamber to incinerate the particulate matter. During the rotation of the shaft 29 the fan 36 will draw air downwardly substantially along a central column, and such air will impinge upon the comminutor plate and spread outwardly toward the side wall of the combustion chamber to provide additional oxygen for supporting combustion and causing the flame to burn hotter. The mean temperature within the combustion chamber is approximately 1600° F and just prior to terminating the introduction of combustible mixture the temperature reaches approximately 2000° F.

At the termination of the flame the solid waste matter is completely incinerated. However, the motor 32 continues to operate and continues to draw air into the combustion chamber to reduce the temperature of the elements within the combustion chamber. In order to expedite the cooling of the combustion chamber, as well as to dispose of liquid waste matter, such liquid is removed from the liquid storage chamber 23 by pump 63 and is pumped through the discharge pipe 64 under pressure into an atomizing nozzle 65 which sprays the liquid into the combustion chamber. When the particles of liquid impinge upon the fan blades 38, comminutor plate 28 and side wall of the combustion chamber, such liquid is substantially instantly vaporized and the vapor is discharged through the discharge pipe or flue 51. The atomized liquid and the downdraft of air caused by the fan 36 causes a rapid transfer of heat from the elements within the combustion chamber so that the toilet is ready for reuse in a relatively short time. It has been found that substantially complete combustion of the waste matter and the cooling of the combustion chamber to the point where the toilet is ready for reuse occurs in approximately 10 minutes.

What is claimed is:

1. In an incinerator toilet having a combustion chamber, comminutor plate means for reducing solid waste matter to particle size, means within said combustion chamber for incinerating said solid waste, fan means within said combustion chamber for drawing air into said chamber for supporting combustion and for cooling said chamber after incineration of the solid waste matter is completed, and discharge pipe means for exhausting air from said combustion chamber to atmosphere, the improvement comprising a liquid storage chamber located in a position to receive liquid from said combustion chamber, pump means connected to said liquid storage chamber and adapted to receive liquid therefrom, a discharge line having one end connected to said pump for receiving liquid under pressure therefrom, nozzle means connected to the opposite end of said discharge pipe, said nozzle means having a discharge portion located within said combustion chamber, whereby liquid waste matter is selectively projected into the combustion chamber when said chamber is at an elevated temperature so that liquid waste matter is vaporized and the vapor is discharged to atmosphere through said discharge pipe means.

2. The structure of claim 1 including shaft means extending through said liquid storage chamber, said comminutor plate means and said fan means being mounted on said shaft means, bearing means supporting said shaft means, means for rotating said shaft means, a well mounted within said liquid storage chamber and disposed about said bearing means, said well adapted to receive liquid from said combustion chamber to keep said bearing means cool.

3. The structure of claim 1 including a baffle box located intermediate the ends of said discharge pipe, said baffle box having a plurality of baffles for causing air from said chamber to move in a serpentine path so that particles of ash fall out of suspension, and drawer means in said box for collecting ash.

4. The structure of claim 1 in which said nozzle means is an atomizing nozzle for reducing said liquid to a fine mist.

5. Apparatus for treating liquid waste matter comprising a combustion chamber, means within said chamber for comminuting solid waste matter, means for introducing a combustible mixture into said chamber at high velocity, means for igniting said combustible mixture, means for directing the ignited mixture in a swirling, burning path around the inner surface of said combustion chamber, a liquid storage chamber in communication with said combustion chamber and adapted to receive liquid waste matter therefrom, pump means for removing liquid waste matter from said liquid storage chamber, discharge pipe means connected at one end to said pump means and connected at the opposite end to a nozzle, a portion of said nozzle being located within said combustion chamber, whereby fluid from said fluid storage chamber is sprayed under pressure into the combustion chamber after incineration of solid waste matter has been completed to accelerate the cooling of the combustion chamber as well as to vaporize the liquid waste matter after which the vapor is exhausted to atmosphere.

6. Apparatus for treating liquid waste matter comprising a combustion chamber, means for comminuting solid waste matter, means for distributing the comminuted waste matter about said chamber, means for incinerating said solid waste matter, a liquid storage chamber adapted to receive liquid waste matter from said combustion chamber, means for removing liquid waste matter from said liquid storage chamber, means whereby fluid from said fluid storage chamber is sprayed under pressure into the combustion chamber after incineration of solid waste matter has been completed to accelerate the cooling of the combustion chamber as well as to vaporize the liquid waste matter after which the vapor is exhausted to atmosphere.

* * * * *